April 16, 1946.  O. H. SAMUELSON ET AL  2,398,465
APPARATUS FOR FORMING HOLLOW GLASS ARTICLES
Original Filed July 11, 1942  2 Sheets-Sheet 1
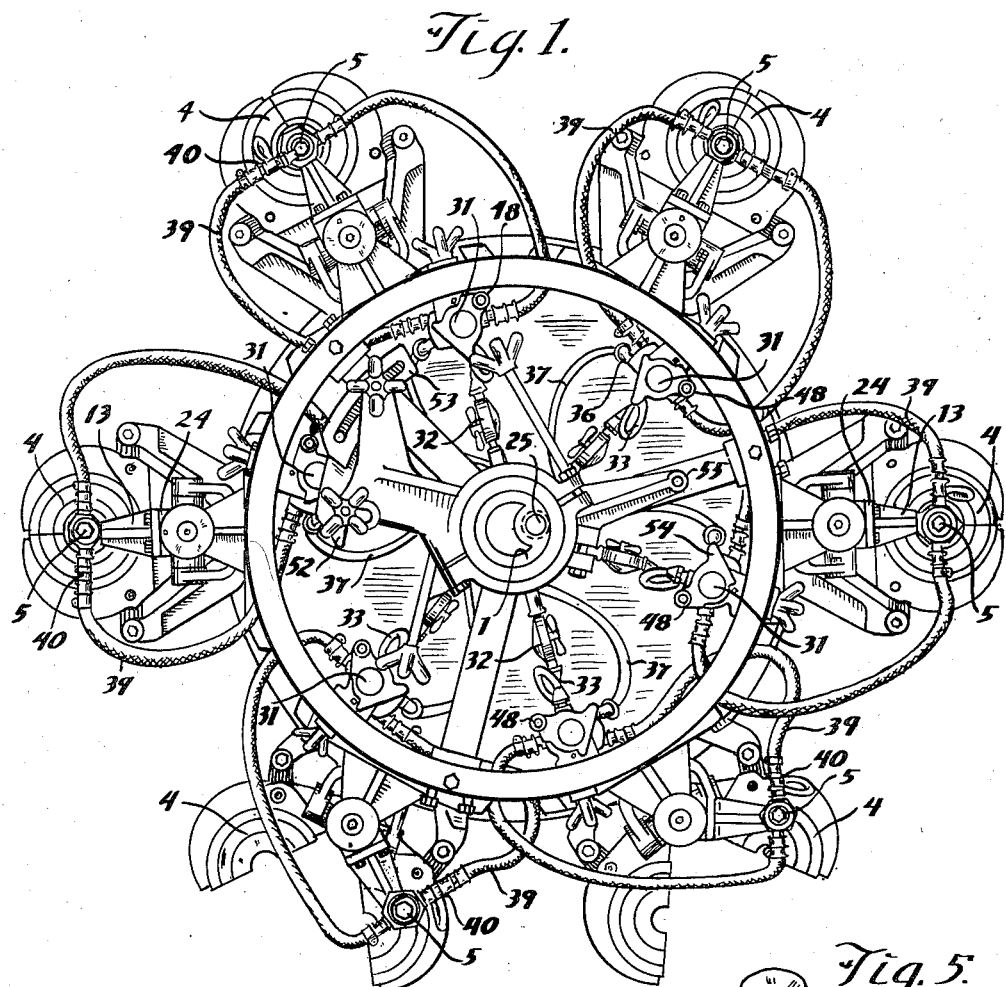
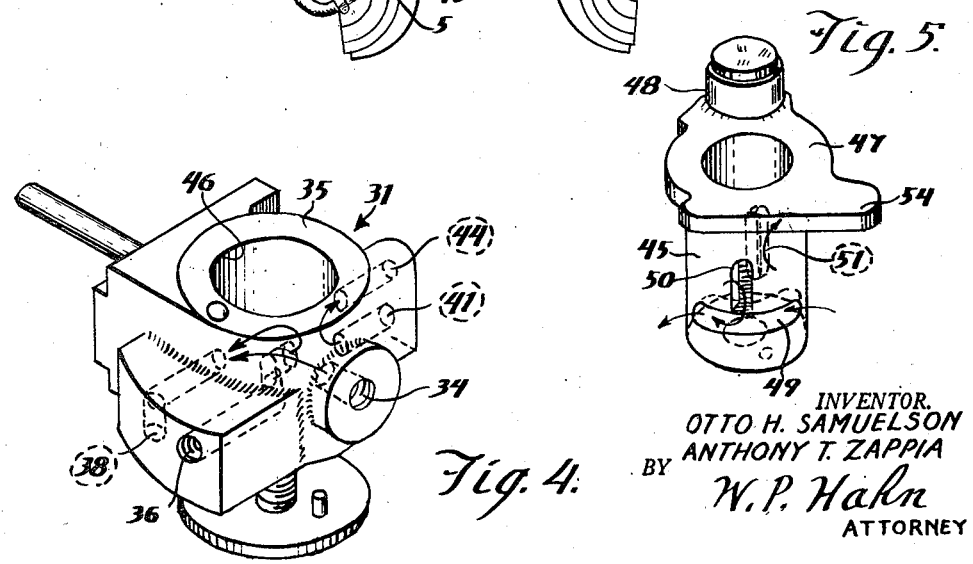
INVENTOR.
OTTO H. SAMUELSON
ANTHONY T. ZAPPIA
BY W. P. Hahn
ATTORNEY

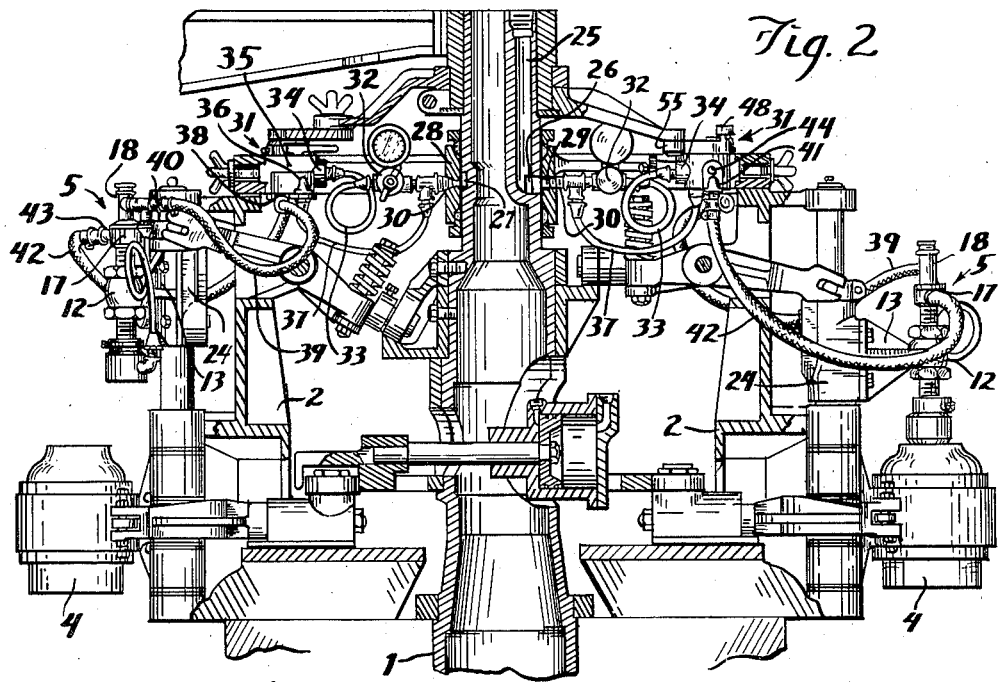

Patented Apr. 16, 1946

2,398,465

UNITED STATES PATENT OFFICE 2,398,465

APPARATUS FOR FORMING HOLLOW GLASS ARTICLES

Otto H. Samuelson, Muncie, and Anthony T. Zappia, Indianapolis, Ind., assignors to S. & Z. Manufacturing Company, Inc., Indianapolis, Ind., a corporation of Indiana Original application July 11, 1942, Serial No. 450,538. Divided and this application May 10, 1943, Serial No. 486,360

6 Claims. (Cl. 49—19)

The present invention relates to apparatus for molding hollow glass containers.

In our co-pending application Serial No. 450,538, filed July 11, 1942 (resulting in United States Letters Patent No. 2,363,999), of which this present application is a division, we have described a method of molding hollow glass containers, wherein there is delivered to the mold differential pressures for the purpose of shaping the container in the mold and for the purpose of more rapidly cooling the formed article or container while in the mold.

It is one of the objects of the present invention to provide an apparatus for expeditiously carrying out said method and to improve the present type of container molding apparatus to permit a more rapid forming of hollow glass containers.

For the purpose of disclosing our invention, we have illustrated in the accompanying drawings a molding machine, or so much thereof as is necessary for the understanding of our invention, and in these drawings, Fig. 1 is a plan view of so much of a molding machine as is necessary for the understanding of the invention;

Fig. 2 is a side elevation partly in section;

Fig. 3 is a longitudinal section of the blow head; and

Figs. 4 and 5 are disassociated views of the valve for controlling the admission of air to the mold.

In the embodiment of the invention, the machine, as a whole, is of standard construction and, therefore, need only be described sufficiently for the purpose of understanding our invention. This machine, as is usual in the commercial type of machine, is provided with a central standard 1, preferably hollow, about which rotates a head 2 surrounding the standard, which head carries a plurality of molds 4 which, during their rotation, are adapted, at one stage, to open to receive the blank and then close for the purpose of receiving air, under pressure, to expand the blank into the mold. The mold is, of course, formed of two sections and the two sections are so shaped as to impart the necessary configuration to the bottle or other container. After the two sections of the mold have been closed, with the blank contained therein, a blow head 5 is lowered on top of the mold in order to admit air under pressure to the interior of the mold. In the specific illustration shown, the blank deposited in the mold has already had the bottle neck formed therein and, as a matter of fact, this bottle neck projects above the top of the mold proper but is closed by the blow head.

More specifically, this blow head includes a head proper 6 having a hollow recess 7 provided on its side walls with an annular groove 8 and having an inner liner 9 provided with ports 10. The ports 10 in this liner coincide with the groove 8 and provide, in effect, air nozzles for directing streams of air against the neck 6a of a bottle blank which projects above the mold proper. The head is preferably detachably mounted from a stem 11 which stem is threaded through a supporting nut 12 which nut is carried at the outer end of the arm 13. Due to the thread and nut arrangement, the vertical position of the blow head relatively to the top of the mold may be adjusted. At the upper end of the stem 11 is a threaded extension 14 which receives a hollow collar 17 having an annular groove 16 therein coinciding with air openings 15 in the stem 14. Above the stem 14 is mounted a T-coupling 18 into which is threaded a nipple 19 smaller in diameter, except at the threaded point, than the T-coupling. The lower end 20 of this nipple is tapered and seats on the top of the stem 14, thereby effectually sealing the top of the stem. This nipple carries a downwardly extending air pipe 21 which extends clear through the stem 11 and projects beyond the end of a head 6 so that when the head is at the sealing engagement with the mold 4, the pipe 21 will project into the blank through the neck of the blank. This nipple 19 is provided with inlet ports 22 so that any air which is admitted to the body of the T-coupling 18 will pass through these ports into the nipple and through the nipple and pipe 21 into the bottle. At the point that the pipe 21 passes through the head 6, the opening 23 is enlarged and this enlarged opening communicates with the interior of the stem 11 so that the air passing down through the pipe 21 and into the bottle may then flow out through the stem 11 around the pipe 21 and through the ports or openings 15. We thus provide two channels for the passage of the air. One is the inlet channel through the pipe 21 and the other is the outlet channel through the stem 11.

The arm 13 for the supporting nut 12 is carried on a suitable reciprocating support 24 and, by means of a reciprocation of this support, the raising and lowering of the blow head relative to the mold 4 is accomplished in proper time relation.

The air or other blowing medium is supplied through the medium of a conduit 25 formed within the standard 1 which conduit is connected with a suitable air compressor or other source of air supply. The lower end of this conduit communicates through an opening 26 with an annular groove 27 in the exterior of the standard 1. Surrounding this groove is an annular air box collar 28 having suitable openings 29 therein communicating with the groove 27 and receiving suitable piping 30, which provides conveying means for conveying the air to the blow heads. This air is conveyed to each blow head through the medium of suitable control valve 31, one for each blow head, which controls the admission of the air to the blow head controlled thereby.

The purpose of this valve 31 is to, first, admit what may be termed "blowing pressure" to the mold. This pressure is sufficient to expand the blank in the mold to cause the blank to conform to the shape of the mold, in other words, to blow the bottle, and; two, to momentarily close the mold against the escape of this blowing pressure and hold this blowing pressure in the mold until the bottle has been properly shaped, and then open the mold to the atmosphere and, at the same time, admit air to the mold under relatively higher pressure which results in the air passing through the container at a relatively high velocity to rapidly blow out the heated blowing air or pressure and admit to the mold a free flowing stream of air which has a tendency to rapidly cool the bottle, thus preventing the sagging of the walls of the bottle and insuring a perfectly formed bottle when the same is delivered from the mold and to do this in a comparatively short time.

The air supply admitted through the supply pipe 25 is admitted to this supply pipe at the maximum pressure desired. Before the blowing air is admitted to the mold, it passes through a suitable reducing valve 32 which reduces the air pressure to the predetermined blowing pressure, and this reduced pressure is supplied through a suitable flexible conduit 33 to inlet port 34 formed in the body or casing 35 of the valve 31. This port 34 communicates with the interior of the valve body and provides for the inlet of the pressure air.

In addition to the inlet port 34, the valve body is provided with a second inlet port 36 which is adapted to be connected by the flexible conduit 37 with the air supply but beyond the reducing valve, so that the pressure admitted through the port 36 is considerably higher than the pressure admitted through the port 34. An outlet port 38 is provided in the valve casing, which port is connected by a flexible conduit 39 with a pipe 40 leading to the stem of the T-coupling 18 so that this port communicates with the air inlet pipe 21 of the blow head. In addition to the above described ports, we provide in the valve body port 41 which is connected by the flexible conduit 42 and the pipe 43 with the collar 17. Also in the valve body, we provide an air escape port 44 which leads to the atmosphere. A branch conduit 40a leads from the conduit 40 to the groove 8.

These various ports are controlled by a rotary valve member 45 which fits within the central opening 46 of the valve body (it being understood that all of the ports heretofore described communicate with this central opening 46), and is supported from an operating head 47 resting upon the top of the valve body and carrying a cam roller 48. This valve 45 is provided, on its face on one side, with an annular groove 49 which is intersected by a vertical groove 50. On its opposite side the valve 49 is provided with a vertical groove 51. These grooves, in the face of the valve 45, are so disposed that when the valve is in what may be termed its initial position, the grooves 49 and 50 connect the inlet port 34, which, it will be remembered, is the blowing pressure port, with the port 38, which port in turn is connected with the T-coupling 18. Therefore blowing pressure is admitted to the blow head, which pressure, it will be remembered, is taken through a reducing valve 32, through the conduit 33 and the port 34 to the groove 49. The blowing pressure passes around the groove 49 and as this groove, with the valve in the initial position, is also in register with the port 38, the blowing pressure air passes out through the port 38 by the way of the conduit 39 and the pipe 40 to the T-coupling 18 and thence through the pipe 21 to the interior of the mold. With the valve 45 in its initial position, the vertical groove 51 is out of register with the ports 41 and 44 so that there is no chance for the air pressure, which is admitted to the mold, to escape. Therefore, the air pressure is momentarily or until the next stage of the valve is reached, held in the mold. This air pressure has a tendency to increase in the blank due to the fact that the mold blank, at this period, is extremely hot and the air within the mold blank and within the mold becomes extremely heated, thereby expanding the air and considerably raising the pressure of the air in the mold. However, this increased pressure, together with the initial pressure adapted to be admitted for blowing the bottle, is nicely calculated, so that the blowing pressure will not, during the short period it is held there, become too great. As the valve moves to its next position, the valve member 45 is rotated, placing the vertical slot 50 in communication with the port 36 and, out of communication with port 38. At the same time, the vertical slot 51 is placed in communication with ports 41 and 44. The slot 44, however, is still in register with the port 38. Therefore, under these circumstances, we have a high pressure or high velocity air coming through the conduit 37, through port 36, through the vertical groove 50 and the groove 49 to port 38 and thence, by conduit 39, to the T-coupling 18 and pipe 21 to the interior of the bottle. At the same time, however, it is to be noted that the groove 51, having placed ports 41 and 44 into communication with one another and the port 41 being connected to the collar 17, the interior of the stem 11 is connected to the atmosphere by an opening which is equalivent in area to the inlet opening. Therefore, a stream of air under high velocity as the result of the increased pressure, is delivered through the bottle and this higher velocity air traveling through the bottle, unobstructedly, will not only drive out the blowing air, heretofore admitted to the bottle, but will deliver through the bottle a cooling stream of air, quickly cooling the bottle and materially assisting in rapidly setting the bottle.

On the next stage of operation of the valve, the valve 45 is rotated until all of the ports are out of communication and closed against inlet of air of any kind, and this constitutes the third stage of the valve which continues until the structure is rotated to begin the initial stage of procedure, as above described.

In addition to the above connection, it is to be noted that there is a connection 40a between the pipe 40 and the annular groove 8 in the head 6. Therefore, in addition to supplying air to the interior of the bottle, a stream of air is delivered against the neck of the bottle which is received within the recess of the blow head, thus providing means for effectually cooling the neck of the bottle at the same time that the interior of the bottle is cooled.

For properly rotating the valve 45 into its respective positions corresponding to the three stages of operation, I provide a pair of cams 52 and 53, the cam 52 being adapted to engage the roller 48 for rotating the valve 45 in a counter-clockwise direction to its initial position for the admission of blowing pressure to the mold. The continued rotation of the mold and blowing head causes the roller 48 to next strike the cam 53 which still further rotates the valve 45 in a counter clockwise direction to its second stage wherein the cooling air is admitted to the mold and eventually an arm 54 on the head 47 of the valve strikes a stationary roller 55 which rotates the valve 45 in a clockwise direction and to its closed position.

It is thus seen that the blowing pressure is admitted to the mold for a comparatively short time and that the cooling pressure is admitted to the mold for a comparatively long period. The cams 52 and 53 and the roller 55 are stationarily mounted so as to be struck by the roller 48 during the rotation of the head, but each cam and roller is adjustable to permit a nice timing of the parts.

We have found, from experience, that very effective results have been produced in the operation of the machine heretofore described and in carrying out of the method heretofore described in molding, for example, a pint flask with rather sharp angles and corners, that an air pressure of substantially twenty pounds is sufficient for the blowing pressure and that thereafter air under pressure of thirty-five to forty pounds can be admitted or circulated through the molded flask for the purpose of cooling the same and that in articles of simpler configuration such, for instance, as a round gallon glass container, six pounds of pressure admitted for the purpose of blowing is sufficient and a cooling pressure of thirty-five to forty pounds is effective for properly cooling the container after the same has been shaped in the mold under the blowing pressure.

We have also found that steam under pressure can be used effectively for blowing and for cooling purpose.

We claim as our invention:

1. In an apparatus for forming hollow glass containers, in combination, a blowing mold adapted to receive a glass blank for blowing, a blow head associated with said mold and movable relatively to said mold to sealingly engage the top of said mold, after the same has received its blank, said head having a fluid pressure inlet passage and a fluid pressure outlet passage communicating with the interior of the mold, a control valve, means for connecting the same with a source of relatively low fluid pressure and a source of relatively high fluid pressure, said control valve having an escape port, connections between said valve and said blow head including a connection between said valve and said inlet passage in the blow head and a connection between said valve and the outlet passage of said blow head, a valve member associated with said control valve having fluid passages therein for connecting the inlet passage of said blow head through said valve with said low pressure source and said high pressure source and for connecting said outlet passage in the blow head with said valve escape port, and means associated with said valve member and operating said valve member to connect said source of low pressure with said head through one of said fluid passages under predetermined conditions, and simultaneously shutting off the escape port of said valve and to connect said high pressure source with said head through one of said fluid passages and simultaneously connecting said blow head outlet passage to the valve escape port through one of said fluid passages.

2. In an apparatus for forming hollow glass containers, in combination, a rotatable support, a blowing mold carried thereby adapted to rotate in a substantially horizontal plane and adapted to receive a glass blank for blowing, a blow head carried by said support and rotating with said mold and sealingly engaging the top of said mold, after it has received its blank, said blow head having a fluid pressure inlet passage and a fluid pressure outlet passage communicating with the interior of the mold, a source of relatively low fluid pressure and a source of relatively high fluid pressure, means interposed between said blow head and said source of relatively low fluid pressure and said source of relatively high fluid pressure, controlling the admission of said pressures to said fluid pressure inlet passage in said blow head, said means also controlling said outlet passage in said blow head, and means associated with said support operating said first mentioned means, to connect said inlet passage in the blow head with the source of relatively low pressure fluid supply and simultaneously close said outlet passage and operated by a continued rotation of said mold and head in their horizontal planes to operate said first mentioned means to connect said inlet passage of said blow head with said source of relatively high pressure and to simultaneously connect said outlet passage in said blow head with an opening to the atmosphere.

3. In an apparatus for forming hollow glass containers, in combination, a rotating support, a blowing mold carried thereby and rotating in a substantially horizontal plane and adapted to receive a glass blank for blowing, a blow head carried by said support rotating with said mold in a horizontal plane and movable relatively to said mold to sealingly engage the top of said mold, after the same has received its blank, said blow head having a fluid pressure inlet passage and a fluid pressure outlet passage communicating with the interior of said mold, a source of relatively low fluid pressure and a source of relatively high fluid pressure, a valve interposed between said blow head and said sources of fluid pressure having means for controlling the admission of fluid pressures from said sources and controlling the escape of fluid pressure through said blow head from said mold, and means associated with said support and operable during the movement of said head and mold to operate said valve to connect said inlet passage in the blow head with said source of relatively low fluid pressure and to simultaneously seal said outlet passage in said blow head, said means being further operable during the movement of said mold to so operate said valve as to connect said inlet passage with said source of relatively high pressure fluid supply and to simultaneously open said outlet passage in said blow head to the atmosphere.

4. In an apparatus for forming hollow glass containers, in combination, a rotating support, a blowing mold adapted to receive a glass blank for blowing carried by said support and rotating therewith in a substantially horizontal plane, a blow head associated with said mold and movable relatively to said mold to sealingly engage the top of said mold, after the same has received its blank, and having a fluid pressure inlet passage and a fluid pressure outlet passage communicating with the interior of the mold, a source of relatively high fluid pressure and a source of relatively low fluid pressure, valve means interposed between said blow head and said source of low fluid pressure and said source of high fluid pressure, said valve means including means for controlling the admission of fluid pressure from said sources to said inlet passage in said blow head, and for controlling the escape of fluid pressure from said mold through said outlet passage in said blow head, means associated with said support for actuating said valve pressure controlling means to place said inlet passage in communication with said source of relatively low fluid pressure and to simultaneously seal the outlet passage of said blow head and actuating means associated with said support for actuating said valve pressure controlling means to place said inlet passage in said blow head in communication with said source of relatively high pressure and to simultaneously open said outlet passage in said blow head to the atmosphere.

5. A control mechanism for glassware forming machines comprising a movable mold carriage, forming molds thereon, a source of low fluid pressure and a source of high fluid pressure and means associated with each of said forming molds and introducing fluid under pressure to said mold and blowing the glass in the mold to a predetermined form and cooling the same, said control mechanism comprising valve means interposed between said source of low fluid pressure and said source of high fluid pressure and each of said fluid introducing means, controlling the admission of fluid to said introducing means, said valve means including means for connecting said introducing means with said source of relatively low fluid pressure, and means for simultaneously sealing the mold against the escape of fluid and means for connecting said introducing means with said source of relatively high pressure and means for simultaneously opening said molds to the atmosphere, means for operating each of said valve means, to connect said introducing means to the mold to said source of low fluid pressure, and to simultaneously seal said mold against the escape of fluid pressure therefrom and means to operate said valve means for connecting said mold introducing means with said source of high fluid pressure and to simultaneously open said mold to the atmosphere to permit the escape of air from said mold.

6. A blowing mechanism for glassware forming machines having a rotatable mold carriage with a series of forming molds thereon, and a source of relatively high fluid pressure and a source of relatively low fluid pressure, said mechanism comprising means, individual to each of said molds and travelling therewith, for admitting fluid under pressure to the respective molds for blowing the glass therein and cooling the same, valve means associated with each of said fluid admitting means and movable therewith and interposed between said fluid sources and said fluid admitting means, said valve means including means for controlling the admission of fluid pressure to the respective molds through said fluid admitting means and means for sealing said molds against the escape of fluid pressure, relatively stationary operating means for successively operating said valve means positioned in the path of said valve means and actuating said valve means for causing said valve admission controlling means to connect said fluid admitting means with a source of relatively low pressure fluid supply and for causing said valve sealing means to simultaneously seal said mold against the escape of fluid, and second actuating means associated with said valve means and positioned in the path of said valve means for actuating said valve admission controlling means to cause the same to connect said fluid admitting means with a source of relatively high fluid pressure supply, and to simultaneously operate said valve sealing means to open said mold to the atmosphere to permit the escape of relatively high fluid pressure.

OTTO H. SAMUELSON.
ANTHONY T. ZAPPIA.